May 28, 1940.   H. J. PATTISON   2,202,465
GRAINING MACHINE
Filed Jan. 29, 1938   5 Sheets-Sheet 4

INVENTOR
Herbert J. Pattison.
BY Dike, Calver and Gray
ATTORNEYS.

May 28, 1940.　　　H. J. PATTISON　　　2,202,465
GRAINING MACHINE
Filed Jan. 29, 1938　　　5 Sheets-Sheet 5

Patented May 28, 1940

2,202,465

UNITED STATES PATENT OFFICE 2,202,465

GRAINING MACHINE

Herbert J. Pattison, Detroit, Mich.

Application January 29, 1938, Serial No. 187,623

13 Claims. (Cl. 101—41)

The present invention relates to improvements in graining machines and in a method of graining particularly but not exclusively adapted for ornamenting multiplanar surfaces of shaped objects, as for example by transferring thereto an ornamental pattern simulating the appearance of a wood grain.

Heretofore the transfer of ornamental patterns to multiplanar surfaces of shaped objects has been attempted by the use of resilient transfer members to which the pattern is transferred from an inked pattern plate or roll. Such processes simulated the process of offset printing and when employed to transfer the pattern to a surface lying chiefly in a single plane were comparatively satisfactory. When, however, the pattern was to be transferred to a multiplanar surface, such for example as a concave or convex surface, difficulty was experienced in shaping the transfer members to conform to the surface to be ornamented and in securing an undistorted transfer of the image from the single plane surface of the printing plate to the multiplanar surface to be ornamented.

In this art it has previously been common practice to effect the transfer of a pattern to multiplanar surfaces by the manual operation of resilient transfer roll members. Such operation is not satisfactory since it is costly and the results achieved are not uniform during the ornamenting of successive pieces as the match lines and grain patterns do not correspond to a desired degree of accuracy. Distortion of the pattern during the transfer to the multiplanar surface was frequently due to the variations of the pressures on the transfer members. The result is that in many fields, as for example in the field of automobile body trim moldings, the expense of ornamenting the surfaces and the lack of uniformity in the ornamentation of the parts have been serious obstacles in the use of such known transfer processes.

It is therefore a principal object of the present invention to provide an offset printing machine adapted for use as a graining machine particularly adapted to transfer a complete ornamental pattern to a multiplanar surface in a single operation and under substantially uniform and automatically controlled operating conditions, thus achieving substantially uniform surface ornamentation of one or several successive multiplanar surfaces.

A further object of the present invention is to provide a graining machine adapted particularly to transfer an inked pattern from the flat surface of an inked plate to a multiplanar surface and producing during such transfer a predetermined substantially uniformly distorted pattern on the said multiplanar surface, which distortion may be compensated for in the formation of the image on the inked plate.

Another object of the present invention is to provide an offset printing press adapted to transfer an inked pattern from an inked pattern member to a surface to be ornamented by an automatically controlled cycle of operations in which successive transfers of the pattern are achieved under controlled and substantially uniform operating conditions, thus assuring accuracy of the transfer and a substantially uniform appearance of the ornamental surfaces on successive work pieces.

A further object of the present invention is to provide an improved method of ornamenting multiplanar surfaces of an object to be ornamented by transference of the ornamental pattern to such surface in a single transfer operation and in which provision is made for the regulation and equalization of automatically controlled pressures exerted on the transfer member during printing contact with the surface to be ornamented.

A further object of the present invention is to provide an offset printing press having a resilient transfer sheet member to which the pattern is accurately transferred from the inked pattern plate by contact under controlled mechanically applied pressures.

Another object of the present invention is to provide a graining machine in which the article having the surface to be ornamented is held firmly in position during reception of the impression, and in which the transfer of the image from the transfer member to the article is achieved without relative movement between the surfaces of the transfer member and the surface of the article during the printing operation.

A further object of the present invention is to provide an improved method and apparatus for decorating surfaces, such for example as the surfaces of sheet metal automotive window frames, having transverse sectional contours deviating from a common plane, and in which the decoration of such surfaces is accomplished in an expeditious and economical manner and in such a way that the variations between different frames and unevenness of the surfaces of the work pieces due to production methods of manufacture will be automatically compensated for in the decorative mechanism during the transfer process.

A further object of the present invention is to provide a graining machine which is adapted to ornament the surface of objects which may be in more than one plane by an offset printing process employing a resilient transfer member which transfers the ornamental pattern to such surface in a single transfer printing operation.

A still further object of the present invention is to provide a method and apparatus for offset printing in which regulated hydraulic pressures are employed on the resilient transfer member to assure substantially equal pressures on all points of the resilient transfer member during transference of the image therefrom to the surface to be ornamented.

Other objects of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The present application is a continuation-in-part of my co-pending application Serial No. 172,822 entitled "Method of printing," and Serial No. 172,823 entitled "Process for graining surfaces of irregularly shaped objects."

The graining machine of the present invention is in effect an offset printing press which is adapted to transfer a pattern from an inked pattern member to a surface to be ornamented by the use of a resilient or elastic sheet transfer member. The machine effects the transfer of the pattern from the inked pattern member to the surface to be ornamented by the following operations:

(1) Inking of the plate;
(2) Transfer of the inked image to the resilient transfer member;
(3) Locating the surface to be ornamented for printing by the resilient or elastic transfer member;
(4) Printing the pattern on the surfaces of the article by contact with the transfer member;
(5) Separation of the printing contact and removal of the ornamented article.

Figure 1:
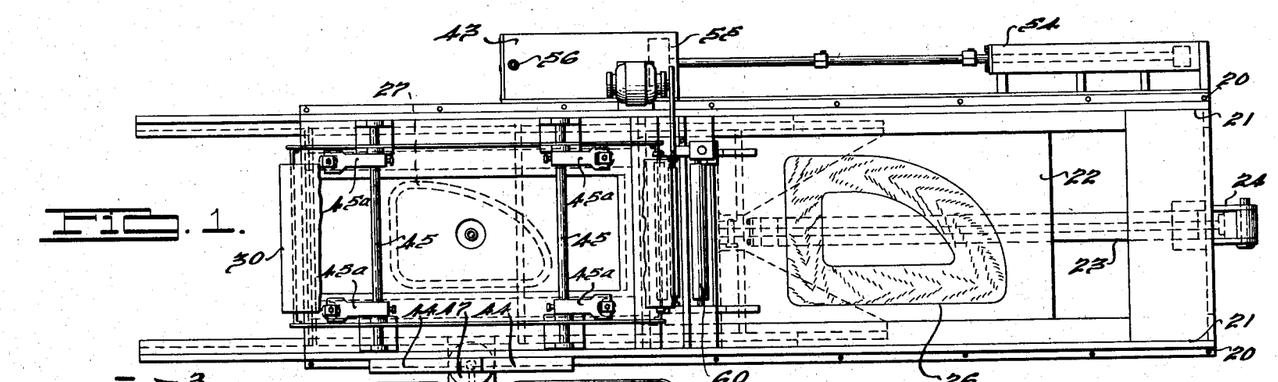
Fig. 1 is a top plan of a graining machine embodying the present invention.
Figure 2:
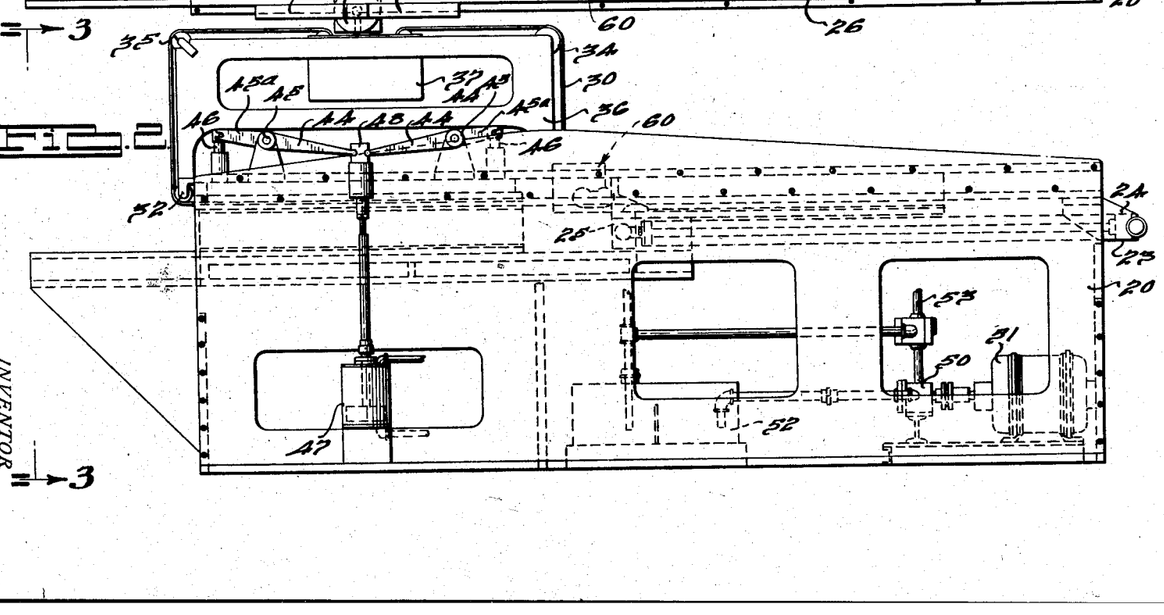
Fig. 2 is a side elevation of the graining machine illustrated in Fig. 1.
Figure 3:
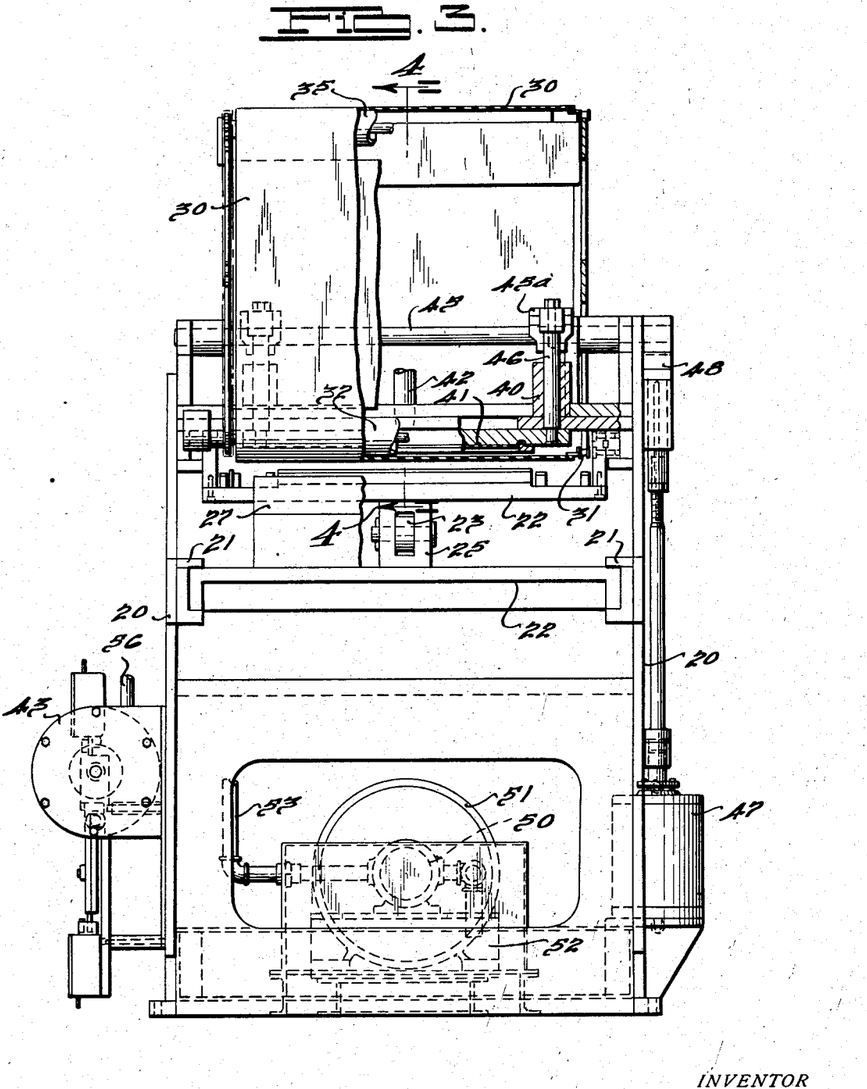
Fig. 3 is an enlarged end view with parts broken away of a graining machine embodying the present invention, taken substantially on the line 3—3 of Fig. 2 in the direction of the arrows.

Referring to Figs. 1, 2 and 3, a machine embodying the present invention may comprise a suitable supporting frame including upright side members 20 having longitudinal slides or ways 21 formed therein or secured thereto. A movable work bed or table 22 is positioned in the slides 21 and is movable longitudinally in said slides. Movement of the table 22 longitudinally of the slides 21 is effected by a hydraulically actuated member 23 in the form of an elongated cylinder in which a piston is mounted for reciprocating movement by fluid pressures exerted thereon to effect movement in both directions. The hydraulically actuated member 23 is secured at one end to a fixed bracket 24 and at the other end is secured to a bracket 25 secured to the table 22, see particularly Figs. 3, 8 and 9.

The table 22 has mounted on one end thereof a pattern element, such for example as the plate 26, which is adapted to be inked and to form the inked pattern which is to be transferred to the surface of the object to be ornamented. At the opposite end of the table 22 there is secured a jig or fixture or work supporting table 27 which is preferably shaped to conform to the external contour of the object, the surface of which is to be ornamented, see Figs. 8 and 9.

With the parts shown in the positions of Fig. 1, the table 22 is in the position where the piece to be ornamented is placed directly beneath the transfer mechanism. The inked pattern is transferred from the plate 26 to the surface of the work piece held in the fixture 27, by means of a resilient transfer member 30, which as here shown is preferably in the form of an endless belt formed of a thin rubber sheet material which will conform readily to the various contours of the surface to be decorated.

Figure 4:
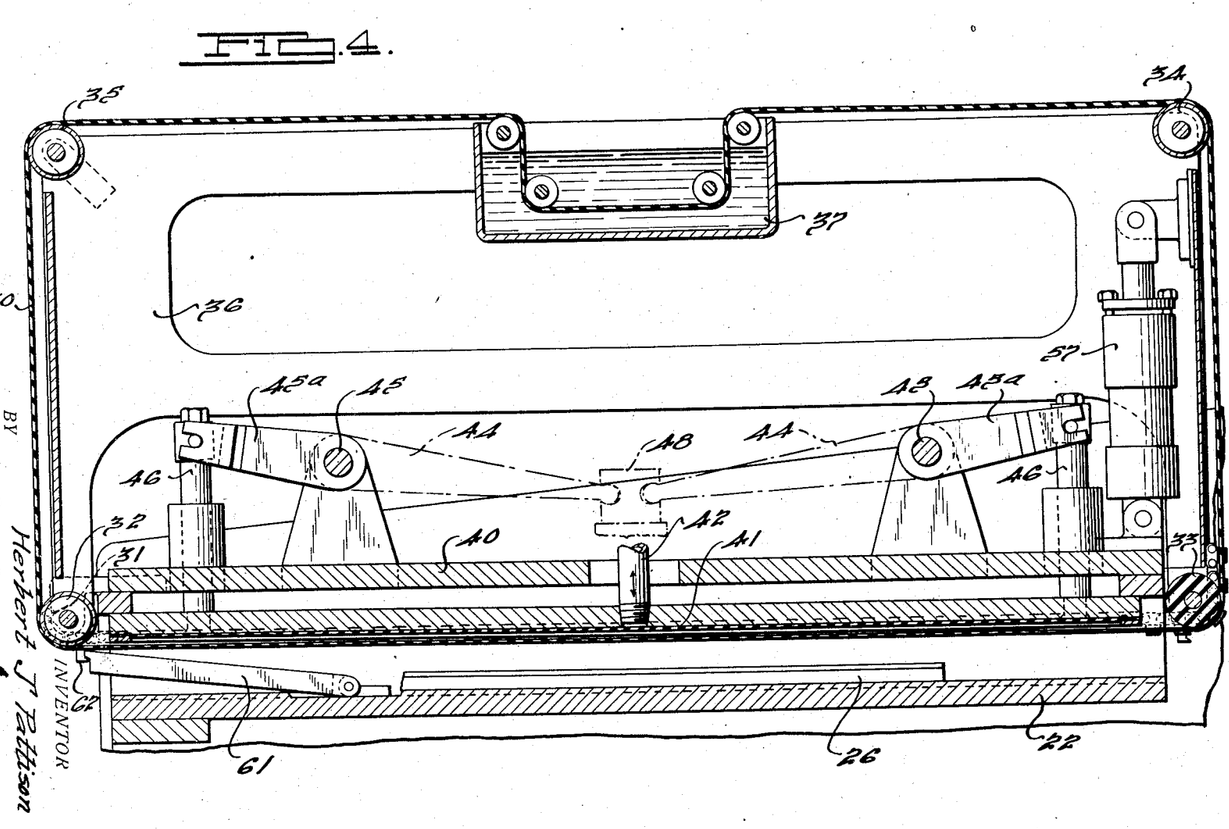
Fig. 4 is an enlarged section taken substantially on the line 4—4 of Fig. 3 looking in the direction of the arrows.

As shown in Figs. 3 and 4, the resilient transfer member 30 is of a width nearly coextensive with the width of the table 22 but is it required to be only the width of the surface to be ornamented. The thin rubber transfer member 30 is secured along opposite edges to endless belt members 31, here shown in the form of roller chain link members but which may also be in the form of V belt members of conventional design. The transfer belt 30 and members 31 extend around the roller members 32, 33, 34 and 35, suitably mounted on shafts mounted in the frame members 36 carried by the frame members 20. The rollers 32, 33, 34 and 35 define the path for the movement of the resilient transfer member 30.

A suitable cleaning bath 37 is provided and the belt as shown in Fig. 4 may run into and through the cleaning bath 37 in which any desired type of conventional scrubbing devices may be employed for the purpose of removing any remaining ink retained by the transfer member after the transfer operation has been completed. In a preferred example of the present invention in which an acid reacting ink is used, the cleaning bath is preferably alkaline and of a nature which does not affect the rubber sheet itself.

As shown in Fig. 4, a movable platen 40 is provided at a point above and adjacent the lower course of the belt 30. The platen 40 is provided with an inflatable member 41, the bottom surface of which overlies the adjacent surface of the lower course of the transfer member 30. A conduit or pipe 42 extends through the platen 40 and terminates at a point adjacent the inflatable member 41. The pipe 42 communicates and is operatively connected with a cylinder 43 (Fig. 1) through the medium of a pipe connection 56 whence air is supplied to the pipe 42 to cause the inflation of the rubber member 41 and the consequent application of printing pressures to the transfer member 30.

The platen member 40 may be arranged as here shown to be movable bodily as a unit in a vertical direction relative to the surface of the piece to be ornamented. Vertical movement of the platen relative to the surface of the piece to be ornamented is accomplished by hydraulic actuation of the swinging arms 44 which causes the rotation of shafts 45. The rotation of the shafts 45 is transmitted through the arms 45a and causes the studs 46 connected therewith and with the platen to be moved vertically. This movement is effected when the hydraulic fluid passes into the cylinder 47.

Figure 6:
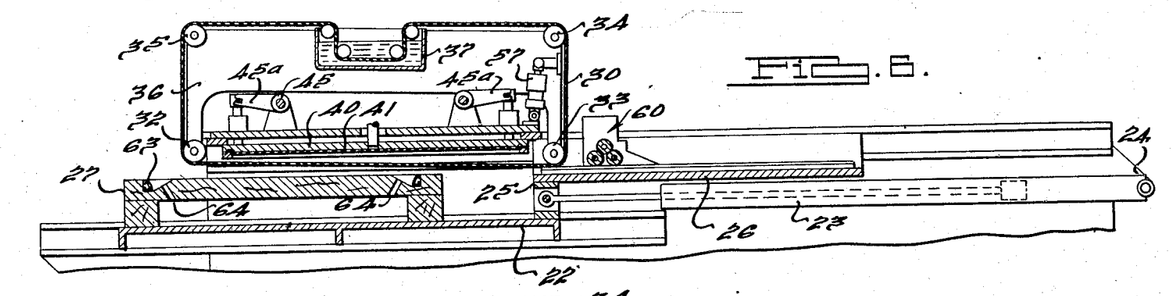

The machine is preferably operated by hydraulic operating mechanisms of conventional design. The source of the hydraulic fluid under pressure in the present embodiment of the invention is a master pump 50 which is power driven by a suitable motor 51. The hydraulic fluid is drawn from the sump 52 by the pump 50 and is forced into the line 53 under pressure, from which it is distributed to the several operating parts, such for example as the hydraulically actuated member 23 for moving the table 22 longitudinally of the frame; the cylinder 47 for accomplishing the vertical movement of the platen; the cylinder 54 for driving the piston 55 which compresses the air in the cylinder 43 to effect inflation of the rubber member 41; and the cylinder 57 (Fig. 4) which is connected with the belt transfer supporting mechanism for causing its pivotal movement about the roller 33 as shown in Fig. 6.

The hydraulic cylinders may be of any suitable conventional construction and may be attached to the respective parts in any suitable manner known to those skilled in the art.

Since the method of connecting the various cylinders with the line 53 containing the main supply of hydraulic fluid under pressure is so well known to those skilled in the art, the drawings herein do not show these connections in detail.

The inking of the pattern member 26 is accomplished by any suitable inking mechanism, such for example as the roller assembly indicated generally by the numeral 60 in Figs. 1, 2 and 5 to 9, inclusive. The purpose of the inking mechanism 60 is to transfer the printing ink from a suitable source of ink supply, such as a reservoir or fountain, to distributing rolls or other suitable mechanism to effect distribution of the ink in a thin film substantially even in thickness over the surface of the pattern member 26. While the roller type of inking mechanism is here shown by way of example, it is to be understood that any conventional type of inking mechanism suitable for this purpose may be employed. For example, if an etched metallic pattern member is used, the ink may be flowed over the surface in excess and the excess amount removed as by a thin scraper or so-called "doctor blade".

Further details of construction of the machine shown in the drawings will become apparent as the description of the operation of the machine proceeds.

*Inking of plate and transfer of image*

Figure 5:
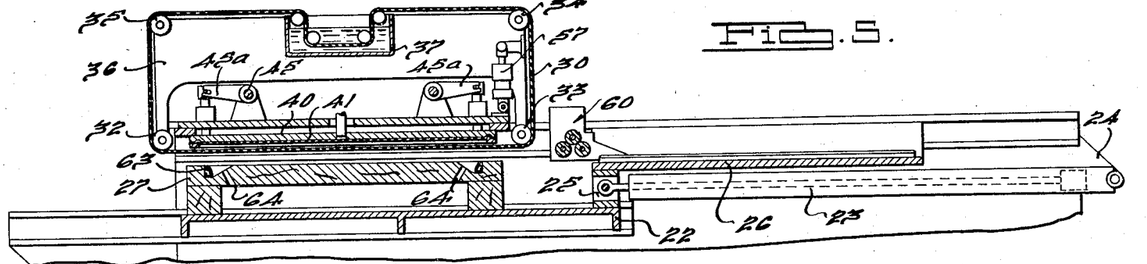
Figs. 5, 6 and 7 are fragmentary longitudinal sections showing the positions of the parts and sequence of operations for transferring the pattern from the inked plate to the transfer member.
Figure 7:
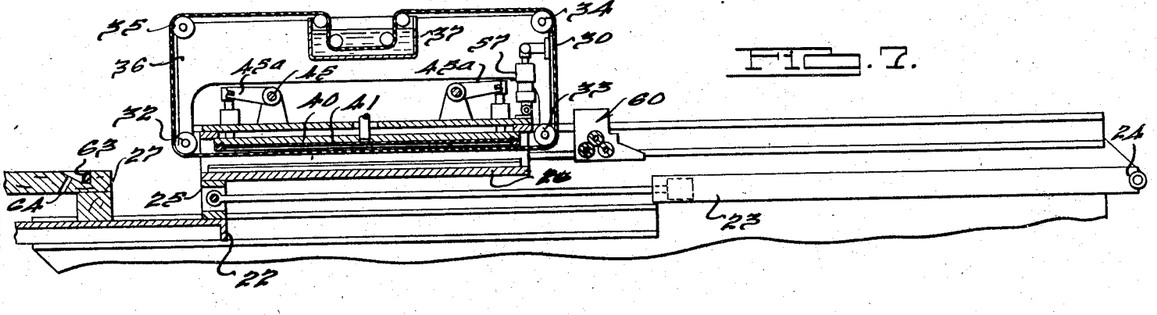

This cycle of operation is best understood by reference to Figs. 5, 6 and 7. As shown in Fig. 5, the parts are in the positions which they occupy at the conclusion of the operation wherein the image has been transferred from the transfer belt 30 to the surfaces of the work piece. When in this position, the pattern member 26 has moved under the inking mechanism indicated generally at 60, has been partially inked and is ready for a further inking.

As shown in Fig. 5 the rubber transfer member 30, when the parts are in this position, is withdrawn from the surface of the fixture 27 so that the fixture 27 may be moved longitudinally of the machine and relative to the belt 30 without damage to the newly decorated surface of the work piece. The next step in this operation is shown in Fig. 6. As here shown, the hydraulic valves have been automatically operated, preferably by movement of the work table, and the cylinder 57 has been actuated to cause the transfer mechanism to be tilted and to be pivoted about the center line of the roller 33. This brings the face of the lower course of the transfer belt 30 into intimate line contact in line with the surface of the roller 33 with the face of the pattern member 26 after said member has been moved to the position shown in Fig. 6 by actuation of the member 23. The roller 33 is an elastic or resilient roller and exerts a substantially uniform mechanical pressure on the face of the resilient transfer belt 30 at the line of contact with the face of the inked pattern member 26. When in this position, the belt 30 is movable synchronously with movement of the pattern member 26, but except for the above described line contact this movement occurs in diverging planes.

As shown in Figs. 6 and 7, as the pattern member 26 moves under the roller 33 it has first to pass under the inking mechanism 60 and an additional supply of ink is applied to the face surface of the pattern member 26. Due to the tilting of the transfer belt mechanism as shown in Fig. 6, the belt 30 comes in contact with the face of the pattern member 26 at but one point and this is a substantially straight line contact at a point on the belt 30 adjacent the periphery of the resilient roller 33. The belt 30 is moved synchronously with the longitudinal movement of the pattern member 26 by means of pusher arms 61 (Fig. 4) which are carried by the movable table 22 and which engage with a depending contacting member 62 secured to the belt members 31 to cause movement of the belt 30. Upon return of the pattern member 26, the arms 61 are detached from the member 62 and the belt 30 is maintained in a static condition on the rollers except for the distention of the member to effect printing of the image thereon. This arrangement of parts causes the belt 30 to move at the same speed that the pattern member 26 is moved when in line contact therewith. This prevents slippage between the contacting surfaces and eliminates possible impairment of the inked image during the transfer operation.

Due to the inclination of the belt in the tilted position of the transfer mechanism shown in Fig. 6, the transfer of the inked image is accomplished only at the line of contact of the surfaces. The continued movement of the pattern member 26 and the lower course of the belt 30 in their respective and divergent planes gives a clean separation of the surfaces which also assists in preventing impairment of the transferred pattern. During this movement the jig 27 travels outwardly and away from the transfer mechanism and the work piece 63 may be removed therefrom and an undecorated blank piece may be inserted therein. This position of the parts is shown clearly in Fig. 7, which represents the positions of the parts at the completion of the transfer of the inked image from the pattern member 26 to the transfer belt 30. If desired, the reciprocated work table here shown can be supplanted by a continuous conveyor carrying spaced alternate pattern members and work-holding jigs.

*Printing of the image*

Figure 8:
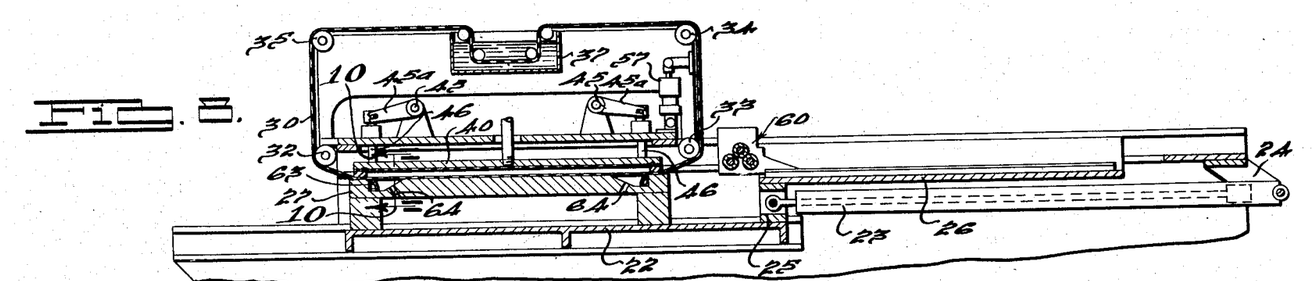
Figs. 8 and 9 are fragmentary longitudinal sections showing the positions of the parts and the sequence of operations for transferring the image from the transfer member to the surface to be ornamented.
Figure 9:
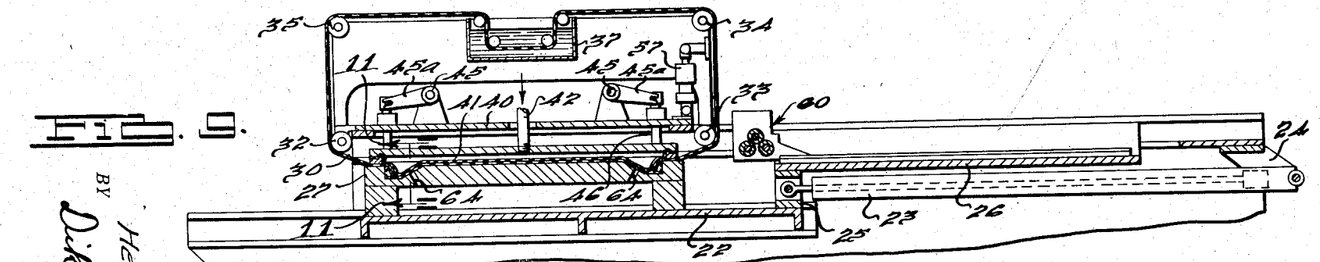
Figures 10, 11, 12:
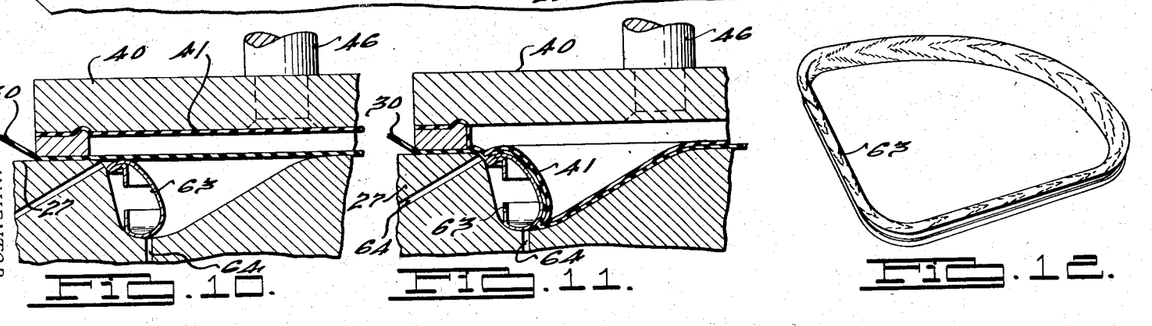
Fig. 10 is an enlarged fragmentary section taken substantially on the line 10—10 of Fig. 8 looking in the direction of the arrows.
Fig. 11 is an enlarged fragmentary section taken substantially on the line 11—11 of Fig. 9 looking in the direction of the arrows.
Fig. 12 is a plan of a motor vehicle body window trim or garnish molding having a surface ornamented by the machine and method embodying the present invention.

Upon completion of the transfer of the inked image to the lower course of the belt 30, the several parts are returned to the positions shown in Fig. 5 and the mechanism is ready for the operation of transferring the image from the transfer member 30 to the surface to be ornamented. This is shown in Figs. 8 to 11, inclusive. When the parts are in the position of Fig. 5, the hydraulic mechanism is adjusted so that a pressure is exerted by the cylinder 47 which causes the platen 40 to be depressed as shown in Fig. 8. This causes the rubber transfer belt 30 to be pressed downwardly and into intimate contact with the surface of the fixture 27 carrying the object 63 having the surface to be ornamented. This causes the resilient transfer member 30 to be tightly stretched across the surface of the jig 27. This position of the parts is shown in enlarged detail in Fig. 10. If it is desired to secure an intimate surface contact of the opposed faces of the resilient member 41 and the lower course of the belt 30, the air entrapped in the space between said surfaces may be vented off through suitable bleeder valves or ducts (not shown). This permits the intimate surface contact of the parts as shown in Figs. 9 and 11. In certain instances it is desirable to provide a fluid cushion between these surfaces, in which instances the entrapped air is compressed by operation of the member 41 and the pressures exerted by this member are distributed through the entrapped air and uniformly applied to the surface of the transfer member 30. Such operation is particularly desirable in those instances where the surface contour of the work piece is such as to render difficult an intimate and uniform contact between the face of the transfer member 30 and all parts of the surface to be decorated.

After the platen 40 has been brought into intimate contact with the resilient transfer member 30 as just described, the hydraulic mechanism is automatically adjusted so that pressure is exerted in the cylinder 54 which drives the piston 55 in the cylinder 43 from which air is forced through the conduits 56 and 42. This movement of air causes distortion of the resilient member 41 which is in turn communicated to the resilient transfer member 30 either by direct contact as shown in Figs. 9 and 11 or by pressures on the entrapped air as previously described. This causes the surface of the rubber transfer belt 30 to conform intimately to the contour of the surface of the member 63 which is to be ornamented. As the resilient member 41 similarly conforms to the same contour or forces the air layer to conform to this contour, it will be seen that a substantially uniform pressure is exerted on all parts of the belt 30 in contact with the said surface. The parts are maintained in this position until the inked image is transferred from the transfer belt 30 to the surface of the part 63. The operation is so timed that the printing operation is completed when the piston 55 has reached the end of its stroke in the cylinder 43.

The direction of the pressure in the cylinder 54 is then changed and the piston 55 is withdrawn in the cylinder 43, creating a suction through the conduits 56 and 42. This withdraws the air pressure behind the rubber member 41 and the resiliency of the member 41 and of the distended lower course of the belt 30 causes them to return to their initial positions as shown, for example, in Fig. 5.

Thus, in accordance with the preferred method herein shown and described, the steps thereof may be briefly summarized as follows, starting from the position of the parts illustrated in Fig. 5. The transfer belt carrying frame 36 is tilted so as to depress the rear end of the lower course of the transfer belt 30 at the locality of the pressure roller 33, as seen in Fig. 6. The work supporting table 27 and the transfer pattern member 26, or supporting surface carrying such member, are then fed forwardly relative to the lower course of the transfer belt, the work supporting table being moved from immediately beneath the belt to the position shown in Fig. 7 and the transfer pattern member 26 being moved from the position of Fig. 5 to a position as shown in Fig. 7 directly beneath the lower course of the transfer belt. The pattern member 26 is inked as it moves forward beneath the inking mechanism. As the pattern member 26 moves from the position of Fig. 6 to the position of Fig. 7, the transfer belt 30 is fed or caused to travel a like distance in the same direction and synchronously therewith. The transfer belt 30 only has a transverse line contact with the inked pattern member 26 at a point directly beneath the axis of the pressure roller 33, and from this point forwardly the transfer pattern member 26 travels in a path diverging from the plane of the lower course of the transfer belt.

Upon completion of the transfer operation, and after the plate 26 has reached the position of Fig. 7, the transfer belt carrying frame 36 is tilted back to its normal position shown in Fig. 7. Thereupon the work support 27 and the transfer plate support 26 are retracted to the position shown in Figs. 5 and 8. Thereupon the platen 40 is lowered or depressed to stretch the transfer belt 30 across the surface of the work support 27, as shown in Figs. 8 and 10. The elastic or resilient pressure member 41 is then inflated to force the transfer belt 30 into intimate contact with the surface of the work piece 63, thus effecting a uniform transfer of the inked pattern to the surface of the work in a single operation. The transfer belt 30 will be released from the work instantaneously upon deflation of the member 41 and elevation of the platen 40 from the work supporting table.

The cycle of operations thus described causes the piece 63 to be ornamented with a surface ornamentation in one transfer operation. This surface may have the appearance as shown by way of example in Fig. 12. When the parts occupy their respective positions as shown in Fig. 5, the cycle of operations above described may be repeated to secure the ornamentation of successive pieces.

During the passing of the parts to the positions shown in Fig. 6 and continuing the operation until the parts occupy the positions shown in Fig. 7, the belt 30 is so moved that a cleaned uninked surface is presented to the inked plate for each transfer of the inked pattern. The portion of the belt which had been used in a preceding operation for transferring the inked pattern to the surface of the work piece 63 travels a distance toward the cleaning bath 37 and finally passes through the cleaning bath 37 wherein the surface is thoroughly cleaned before it is again used to transfer the inked image from the plate 26.

In order to insure the intimate contact of the surface of the article to be ornamented and the belt 30, a plurality of air release or bleeder ducts 64 preferably are provided in the jig 27 so that the air entrapped by the belt 30 in the spaces between the jig 27 and the work piece 63 may be readily exhausted as the transfer belt is forced into the position shown in Fig. 11.

Any preferred type of offset pattern member 26, such for example as the transfer plate here shown, may be used in a machine of the present invention. In carrying out a preferred embodiment of the present invention I have successfully utilized a transfer plate formed in accordance with the disclosures of my co-pending application Serial No. 172,821 and my co-pending application Serial No. 172,823.

As disclosed in the said applications, a suitable type of pattern member may be a plate in which a sensitized colloid coating, such for example as bi-chromated gelatin, is exposed through a photographic negative of the pattern which is to be transferred. After suitable treatment the plate will absorb a quantity of ink in those portions where it has been least exposed to light and will thus form an inked positive outline of the grain pattern. It is to be understood, however, that any suitable type of plate, such for example as a zinc or copper half tone, or any type of engraved intaglio plate, may be used in the machine of the present invention. Also if desired, a pattern member in the form of a cylindrical roller member may be used with suitable changes in the inking mechanism and the provision of suitable contact with the surface of the transfer member to effect the transfer thereto of the inked pattern.

The transfer member 30 is preferably formed of a thin resilient rubber sheet which is readily flexible to conform to the multiplanar contour of the surface of the object to which the pattern is to be transferred. A sheet of the general type heretofore used in forming rubber dams in dental work has been found to be satisfactory, although it is preferable that the sheet be somewhat thicker than the conventional rubber dam sheet.

While various types of natural or artificial resilient rubber sheets are the generally preferred materials for this purpose, other materials than rubber may be used to form the belt 30 in accordance with the present invention as long as such materials have the following properties:

(1) A surface capable of picking up the inked image from the plate or roller;

(2) Ready flexibility to conform to the surface contours of the surface of the object to be ornamented; and (3) Elasticity or resiliency sufficient to return the member to its initial position after transference of the image.

The member 30 is arranged so that upon the exertion of pressure thereon forcing the member toward the surface of the object or work to be ornamented, the member is inflated and its surface distended and pressed into intimate contact with such work surface. Upon release of the pressure on the belt 30, the resiliency of the material forming the belt 30 causes the contact with the surface to be ornamented to be broken instantaneously and to effect the immediate return of the belt to its normal position. This manner of breaking contact with the adjacent surface is an important feature of the present invention as it insures a clean transfer of the inked image from the belt 30 to the surface to be ornamented, without impairment of the detail of the inked image due to blurring which is frequently caused in known commercial processes by a slippage of a movable transfer member relative to the surface to be ornamented. In the embodiment of the invention here shown, the diminished pressures created within the member 41 by the return movement of the piston 55 also assists in the practically instantaneous separation of the printing surface and the surface to be ornamented.

I claim:

1. An offset printing press comprising a frame, a bed movable longitudinally of said frame, a printing member comprising an elastic belt extending above said bed and having a lower course lying in a plane substantially parallel to the plane of a pattern member mounted on said bed, means for inking said pattern member and transferring an inked pattern to the lower course of said belt upon movement of said bed, a fixture on the opposite end of said bed carrying a surface to be printed upon, an inflatable platen disposed above the lower course of said belt and adapted for vertical movement relative thereto, means for moving said platen to bring the lower course of said belt into intimate contact with the surface to be ornamented, and means for inflating said platen to force the lower course of said belt into intimate printing contact with the surface to be printed upon.

2. An offset printing press comprising a frame, a bed movable longitudinally of said frame, a resilient printing member comprising a resilient belt having a lower course extending above said bed and lying chiefly in a plane substantially parallel thereto, a pattern member mounted on said bed, means for inking said member and transferring the inked pattern to said belt upon movement of said bed, a fixture on the opposite end of said bed carrying a surface to be printed upon, an inflatable platen disposed above said belt and adapted for vertical movement relative thereto, means for moving said platen to bring said resilient belt into intimate contact with the surface to be ornamented, means for inflating said platen to force said belt into intimate printing contact with the surface to be printed upon, and means for generating reduced pressures within said inflatable platen to facilitate a clean breaking of the contact between the printing member and the surface printed upon.

3. A graining machine comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, and an inflatable pressure member acting on said transfer sheet to apply pressures on the lower surface of said sheet to effect a printing transfer of the image thereon.

4. A graining machine comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, an inflatable pressure member acting on said transfer sheet, and means for inflating said pressure member to apply pressures on the lower surface of said sheet to effect a printing transfer of the image thereon.

5. A graining machine comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, and an inflatable pressure member spaced from said transfer sheet and having a resilient surface adapted to be extended to contact said transfer sheet and exert a pressure thereon upon inflation of said member, to apply pressures on said transfer sheet and effect a printing transfer of the image carried thereon.

6. A graining machine comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, an inflatable pressure member spaced from said transfer sheet and having a resilient surface adapted to be extended to contact said transfer sheet and exert a pressure thereon upon inflation of said member, and means for inflating said pressure member to apply pressures on said transfer sheet and effect a printing transfer of the image carried thereon.

7. A machine for surface graining an article of curvilinear contour comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, an inflatable pressure member acting on said transfer sheet, and means for inflating said pressure member to apply pressures on the lower surface of said sheet to effect a printing transfer of the image thereon to the article to be grained, said pattern member and said article being supported on opposite ends of said movable bed and being alternately movable into position for contact with the lower surface of said transfer sheet.

8. A machine for surface graining an article of curvilinear contour comprising a frame, a bed movable relative to said frame, an offset printing member having an elastic transfer sheet having its lower surface lying chiefly in a plane substantially parallel to said bed, a graining pattern member, means for inking said pattern member, means for mechanically transferring the inked pattern from said member to the lower surface of said elastic transfer sheet, an inflatable pressure member acting on said transfer sheet, and means for inflating said pressure member to apply pressures on the lower surface of said sheet to effect a printing transfer of the image thereon to the article to be grained, said pattern member and said article being supported on opposite ends of said movable bed and being alternately movable in a substantially linear direction into position for contact with the lower surface of said transfer sheet, said transfer sheet being supported on a tiltable frame and being movable in an endless path, whereby successive portions of said pattern member linearly contact successive portions of said sheet.

9. A graining machine comprising a frame, a bed movable relative to said frame, an offset printing member having an endless elastic transfer sheet having its lower run lying in a plane adjacent and substantially parallel to the plane of movement of said bed, a graining pattern member, means for inking said pattern member, means for mechanically transferring the inked pattern from said member to the lower surface of said elastic transfer sheet, an inflatable pressure member acting on said transfer sheet, and means for inflating said pressure member to apply pressures on the lower surface of said sheet to effect a printing transfer of the image thereon.

10. A graining machine comprising a frame, a bed movable relative to said frame, an offset printing member having an elastic transfer sheet having its lower surface lying chiefly in a plane substantially parallel to said bed, a graining pattern member supported on and movable with said bed, means for inking said pattern member, means for progressively moving said pattern member into contact with said inking means and said transfer sheet, whereby said pattern member and said transfer sheet are successively inked, an inflatable pressure member acting on said transfer sheet, and means for inflating said pressure member to apply pressures on the lower surface of said sheet to effect a printing transfer of the image thereon.

11. A graining machine comprising a frame, a bed movable horizontally relative to said frame, an offset printing member having a transfer sheet lying in a plane adjacent and substantially parallel to the plane of movement of said bed, a graining pattern member carried by said bed, means for inking said pattern member, a work support carried by said bed, and an inflatable pressure member acting on said transfer sheet to effect a printing transfer of the image thereon, said pattern member and said work support being alternately movable into proximity with said transfer sheet, whereby the inked pattern on said pattern member is successively transferred from said pattern member to said transfer sheet and from said transfer sheet to the work on said work support.

12. A graining machine comprising a frame, a bed movable relative to said frame, an offset printing member having a transfer sheet lying in a plane adjacent and substantially parallel to the plane of movement of said bed, said transfer sheet being movable by said bed, a graining pattern member supported on and movable with said bed, means for inking said pattern member, means for progressively moving said pattern member into contact with said inking means and said transfer sheet whereby said pattern member and transfer sheet are successively inked, and an inflatable pressure member acting on said transfer sheet to effect a printing transfer of the image thereon.

13. A graining machine comprising a frame, a bed movable horizontally relative to said frame, an offset printing member having an endless elastic transfer sheet movable in a plane adjacent and substantially parallel to the plane of movement of said bed, a graining pattern member carried on one end of said bed, a work support on the other end of said bed, means for inking said pattern member, means for progressively moving said pattern member into contact with said inking means and said transfer sheet, an inflatable pressure member acting on said elastic transfer sheet, and means for inflating said pressure member to apply pressures on the lower run of said sheet to effect a printing transfer of the image thereon, said transfer sheet being supported on a tiltable frame to provide linear contact between said sheet and said pattern member, and said pattern member and said work support being alternately movable into proximity with said transfer sheet, whereby the inked pattern on said pattern member is successively transferred from said pattern member to said transfer sheet and from said transfer sheet to the work on said work support.

HERBERT J. PATTISON.